(12) United States Patent
Murphree et al.

(10) Patent No.: US 10,920,303 B2
(45) Date of Patent: Feb. 16, 2021

(54) INDUCED MATERIAL SEGREGATION METHODS OF MANUFACTURING A POLYCRYSTALLINE DIAMOND TOOL

(71) Applicant: Halliburton Energy Services, Inc., Houston, TX (US)

(72) Inventors: Zachary Ryan Murphree, Dallas, TX (US); Andy Cheng Chang, Houston, TX (US); Gagan Saini, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 701 days.

(21) Appl. No.: 15/569,908

(22) PCT Filed: May 28, 2015

(86) PCT No.: PCT/US2015/032887
§ 371 (c)(1),
(2) Date: Oct. 27, 2017

(87) PCT Pub. No.: WO2016/190872
PCT Pub. Date: Dec. 1, 2016

(65) Prior Publication Data
US 2018/0119254 A1    May 3, 2018

(51) Int. Cl.
*E21B 10/567* (2006.01)
*E21B 10/46* (2006.01)
(Continued)

(52) U.S. Cl.
CPC .............. *C22C 29/08* (2013.01); *B22F 3/15* (2013.01); *B22F 5/003* (2013.01); *B22F 7/06* (2013.01);
(Continued)

(58) Field of Classification Search
CPC ... C22C 29/08; C22C 1/1084; C22C 2204/00; B22F 3/15; B22F 5/003; B22F 7/06;
(Continued)

(56) References Cited

U.S. PATENT DOCUMENTS 4,789,385 A    12/1988  Dyer et al.
5,022,894 A     6/1991  Vagarli et al.
(Continued)

FOREIGN PATENT DOCUMENTS

CN    2906032       5/2007
CN    103261563     8/2013
(Continued)

OTHER PUBLICATIONS

Bansal, Narottam P. Innovative Processing and Synthesis of Ceramics, Glasses, and Composites. vol. 94. The American Ceramic Society, 1999; 8 pages.
(Continued)

*Primary Examiner* — Pegah Parvini
(74) *Attorney, Agent, or Firm* — Baker Botts, L.L.P.

(57) ABSTRACT

Induced material segregation methods of manufacturing a polycrystalline diamond compact (PDC) cutter result in formation of a polycrystalline diamond/tungsten carbide (WC) composite material having a smooth compositional gradient from maximum WC concentration at one face to maximum diamond concentration at another face. Because the compositional gradient is smooth, very little or no mismatch of coefficient of thermal expansion occurs, which improves a service lifetime of the PDC cutter.

20 Claims, 3 Drawing Sheets

(51) Int. Cl.
| | |
|---|---|
| *C22C 29/08* | (2006.01) |
| *C22C 1/10* | (2006.01) |
| *B22F 3/15* | (2006.01) |
| *B22F 5/00* | (2006.01) |
| *B22F 7/06* | (2006.01) |
| *B23P 15/30* | (2006.01) |
| *E21B 10/02* | (2006.01) |
| *C22C 26/00* | (2006.01) |

(52) U.S. Cl.
CPC ............ *B23P 15/30* (2013.01); *C22C 1/1084* (2013.01); *E21B 10/02* (2013.01); *E21B 10/46* (2013.01); *E21B 10/567* (2013.01); *B22F 2005/001* (2013.01); *B22F 2202/15* (2013.01); *B22F 2999/00* (2013.01); *C22C 2026/006* (2013.01); *C22C 2204/00* (2013.01)

(58) Field of Classification Search
CPC ............ B22F 2005/001; B22F 2202/15; B22F 2999/00; B23P 15/30; E21B 10/02; E21B 10/567; E21B 10/46
See application file for complete search history.

(56) References Cited

U.S. PATENT DOCUMENTS

| | | | |
|---|---|---|---|
| 5,075,053 A * | 12/1991 | Bernadic | B22F 3/1275 |
| | | | 264/109 |
| 5,662,720 A | 9/1997 | O'Tighearnaigh | |
| 5,820,985 A | 10/1998 | Chow et al. | |
| 5,833,021 A | 11/1998 | Mensa-Wilmot et al. | |
| 6,090,343 A | 7/2000 | Kear et al. | |
| 6,220,375 B1 | 4/2001 | Butcher et al. | |
| 6,286,498 B1 | 9/2001 | Sung | |
| 6,544,308 B2 | 4/2003 | Griffin et al. | |
| 6,797,326 B2 | 9/2004 | Griffin et al. | |
| 7,396,501 B2 | 7/2008 | Pope et al. | |
| 7,517,589 B2 | 4/2009 | Eyre | |
| 7,533,740 B2 | 5/2009 | Zhang et al. | |
| 7,575,805 B2 | 8/2009 | Achilles et al. | |
| 7,712,553 B2 | 5/2010 | Shamburger | |
| 8,056,650 B2 | 11/2011 | Middlemiss et al. | |
| 8,172,012 B2 | 5/2012 | Achilles | |
| 8,267,204 B2 | 9/2012 | Lyons | |
| 8,383,200 B2 | 2/2013 | Xiao et al. | |
| 8,501,144 B1 | 8/2013 | Bertagnolli | |
| 8,567,531 B2 | 10/2013 | Belnap et al. | |
| 8,679,206 B2 | 3/2014 | Wan | |
| 8,695,733 B2 | 4/2014 | Fang et al. | |
| 8,721,752 B2 | 5/2014 | Fuller et al. | |
| 8,758,463 B2 | 6/2014 | Cariveau et al. | |
| 9,103,173 B2 | 8/2015 | Chakraborty et al. | |
| 9,512,681 B1 * | 12/2016 | Mukhopadhyay | E21B 10/42 |
| 9,555,519 B2 | 1/2017 | Suryavanshi | |
| 2002/0145213 A1 | 10/2002 | Liu et al. | |
| 2005/0117984 A1 * | 6/2005 | Eason | E21B 10/46 |
| | | | 408/144 |
| 2006/0059785 A1 | 3/2006 | Sung | |
| 2008/0073126 A1 | 3/2008 | Shen et al. | |
| 2008/0178535 A1 * | 7/2008 | Wan | B24D 18/0009 |
| | | | 51/297 |
| 2009/0011367 A1 | 1/2009 | Omatsu et al. | |
| 2010/0000158 A1 | 1/2010 | De Leeuw-Morrison et al. | |
| 2010/0126779 A1 | 5/2010 | Corbett et al. | |
| 2011/0017414 A1 | 1/2011 | Wang et al. | |
| 2011/0042147 A1 | 2/2011 | Fang et al. | |
| 2011/0073380 A1 | 3/2011 | Digiovanni | |
| 2012/0040157 A1 * | 2/2012 | Konyashin | C22C 29/08 |
| | | | 428/212 |
| 2012/0125696 A1 * | 5/2012 | Belnap | E21B 10/567 |
| | | | 175/434 |
| 2012/0225253 A1 * | 9/2012 | DiGiovanni | B24D 99/005 |
| | | | 428/161 |
| 2012/0241226 A1 | 9/2012 | Bertagnolli et al. | |
| 2013/0092453 A1 | 4/2013 | Johnson | |
| 2013/0133957 A1 * | 5/2013 | Belnap | E21B 10/573 |
| | | | 175/432 |
| 2013/0167447 A1 * | 7/2013 | Webb | C04B 35/52 |
| | | | 51/298 |
| 2014/0237906 A1 | 8/2014 | Alkhalaileh et al. | |
| 2014/0262546 A1 | 9/2014 | Flood et al. | |
| 2017/0107768 A1 | 4/2017 | Saini et al. | |

FOREIGN PATENT DOCUMENTS

| | | |
|---|---|---|
| KR | 2009-0086999 | 8/2009 |
| KR | 2013-0130754 | 12/2013 |

OTHER PUBLICATIONS

Klosterman, Don, et al. "Laminated object manufacturing, a new process for the direct manufacture of monolithic ceramics and continuous fiber CMCs." Proceedings of the 21st Annual Conference on Composites, Advanced Ceramics, Materials, and Structures-B: Ceramic Engineering and Science Proceedings, vol. 18, Issue 4. John Wiley & Sons, Inc., 1997; 8 pages.

Marcus, Harris L., et al. "Solid Freeform Fabrication Symposium Proceedings." NASA STI/Recon Technical Report N 94 (1993); 397 pages.

Cui, Xuemin, et al. "A study on green tapes for LOM with water-based tape casting processing." Materials Letters 57.7 (2003): 1300-1304; 5 pages.

Das, Anirban, et al. "Binder removal studies in ceramic thick shapes made by laminated object manufacturing." Journal of the European Ceramic Society 23.7 (2003): 1013-1017; 5 pages.

Gomes, Cynthia M., et al. "LZSA glass-ceramic laminates: fabrication and mechanical properties." journal of materials processing technology 206.1 (2008): 194-201; 8 pages.

Daleffe, R. V., M. C. Ferreira, and J. T. Freire. "Effects of binary particle size distribution on the fluid dynamic behavior of fluidized, vibrated and vibrofluidized beds." Brazilian Journal of Chemical Engineering 25.1 (2008): 83-94; 15 pages.

Gomes, Cynthia M., et al. "Colloidal processing of glass—ceramics for laminated object manufacturing." Journal of the American Ceramic Society 92.6 (2009): 1186-1191; 6 pages.

Olasaju O. Olaofe, K.A. Buist, N. G. Deen, M.A. van der Hoef, and J.A.M. Kuipers, "Particle Mixing and Segregation in Gas-Solid Fluidized Beds Containing Binary Mixtures" in "The 14th International Conference on Fluidization—From Fundamentals to Products", J.A.M. Kuipers, Eindhoven University of Technology R.F. Mudde, Delft University of Technology J.R. van Ommen, Delft University of Technology N. G. Deen, Eindhoven University of Technology Eds, ECI Symposium Series, (2013). http://dc.engconfintl.org/fluidization_xiv/108; 9 pages.

Hoffmann, A. C., and E. J. Romp. "Segregation in a fluidised powder of a continuous size distribution." Powder Technology 66.2 (1991): 119-126; 8 pages.

Bender, Barry A., Chulho Kim, and Carl Wu. "Solid freeform fabrication of a piezoelectric ceramic torsional actuator motor." 28th International Conference on Advanced Ceramics and Composites A: Ceramic Engineering and Science Proceedings, vol. 25, Issue 3. John Wiley & Sons, Inc., 2004; 6 pages.

Bender, Barry A., et al. "Mechanical and piezoelectric properties of laminated object manufactured ceramics." 26th Annual Conference on Composites, Advanced Ceramics, Materials, and Structures: B: Ceramic Engineering and Science Proceedings, vol. 23, Issue 4. John Wiley & Sons, Inc., 2002; 8 pages.

International Search Report and Written Opinion received for PCT Patent Application No. PCT/US2015/032887, dated Feb. 12, 2016; 10 pages.

International Preliminary Report on Patentability for PCT/US2015/032887, dated Dec. 7, 2017; 6 pages.

Office Action for Chinese Patent Application No. 201580078749.0, dated Sep. 27, 2018; 10 pages.

Office Action for Canadian Patent Application No. 2980275, dated Sep. 25, 2018; 3 pages.

(56) References Cited

OTHER PUBLICATIONS

Office Action for Korean Patent Application No. 10-2017-7030837, dated Jan. 9, 2019, no English translation; 7 pages.

\* cited by examiner

INDUCED MATERIAL SEGREGATION METHODS OF MANUFACTURING A POLYCRYSTALLINE DIAMOND TOOL

RELATED APPLICATIONS

This application is a U.S. National Stage Application of International Application No. PCT/US2015/032887 filed May 28, 2015, which designates the United States, and is incorporated herein by reference in its entirety.

TECHNICAL FIELD

This disclosure relates generally to manufacturing of tools and, more particularly, a polycrystalline diamond compact (PDC) tool, such as a cutter in an earth-boring drill bit.

BACKGROUND

Various types of tools are used to form wellbores in subterranean formations for recovering hydrocarbons such as oil and gas lying beneath the surface. Examples of such tools include rotary drill bits, hole openers, reamers, and coring bits. Rotary drill bits include fixed cutter drill bits, which may have polycrystalline diamond compact (PDC) cutters secured to a bit body. Such bits having PDC cutters are conventionally referred to, therefore, as PDC bits. PDC bits include PDC cutters, which are formed from polycrystalline diamond and a cemented-tungsten carbide (WC) substrate. Some amount of a sintering aid, such as cobalt (Co) or nickel (Ni), is typically included when the high-temperature, high pressure (HTHP) process is performed to form a PDC. Sintering aids may be informally referred to in the art as "catalyzing" materials or "catalyst(s)" due to those materials' participation in forming diamond-diamond bonds during the original HTHP process used to form the PDC. Some amount of this so-called catalyst may remain within a diamond table after forming the diamond table.

The different materials present in such a PDC cutter (polycrystalline diamond, WC, and the catalyst) may have significantly different coefficients of thermal expansion (CTE). The PDC cutter experiences large temperature variations and cycles during drilling. The CTE mismatch among the different material phases in a traditionally manufactured PDC cutter may generate undesirably large stresses during the temperature cycles, which may adversely affect a service lifetime of the PDC cutter due to potential failure modes. A leaching process is sometimes performed to remove some portion of residual cobalt or other materials originally included as a sintering aid during the original HTHP process. This can reduce the undesirable effects of CTE mismatch such as those described above.

BRIEF DESCRIPTION OF THE DRAWINGS

A more complete understanding of the present embodiments and advantages thereof may be acquired by referring to the following description taken in conjunction with the accompanying drawings, which show particular embodiments of the current disclosure, in which like numbers refer to similar components, and in which.

DETAILED DESCRIPTION

The present disclosure relates to induced material segregation methods of manufacturing a PDC cutter for use in an earth-boring drill bit.

The following abbreviations are used throughout this specification:
HTHP—high temperature high pressure
PDC—polycrystalline diamond compact
CTE—coefficients of thermal expansion
GIL—gradient interfacial layer
TSP—thermally stable polycrystalline Elements and compounds are abbreviated using their standard abbreviations, such as Co for cobalt, and WC for tungsten carbide.

PDC cutters may have a PDC layer bonded to a substrate, such as WC using a HTHP process. CTE mismatch between the PDC layer and the substrate may generate stresses during temperature cycles as the PDC cutter is used. These stresses may result in damage to or failure of the PDC cutter. Previous attempts to solve such problems have relied upon bonding two dissimilar materials through brazing or by using a number of discrete gradient layers. However, CTE mismatch, and the resulting thermally-induced stress concentrations, still occur between the different layers.

Induced material segregation methods of manufacturing a PDC cutter, such as for use in a PDC bit, may provide a relatively smooth compositional gradient that reduces the CTE mismatch along a compositional axis of the PDC cutter. The induced material segregation methods disclosed herein may be economically feasible and suitable for industrial scale. The induced material segregation methods disclosed herein may enable a relatively smooth compositional gradient structure that can be modulated based on diamond particle size. The induced material segregation methods disclosed herein may produce PDC cutters for PDC bits that have inherent performance advantages, such as higher thermal stability and increased service lifetimes, resulting in increased rate of hydrocarbon production operations and lower non-productive time of drilling equipment and services.

The two main components for PDC cutters, polycrystalline diamond and WC, are both widely manufactured by sintering and compaction of particulate blends, also referred to as powder blends. The induced material segregation methods disclosed herein use the same raw materials and induce segregation in the unsintered particulate mixture, also referred to as the green-state, to produce a smooth compositional transition from substrate-rich material (such as WC) to polycrystalline diamond-rich material within a single unitary part. The resulting smooth compositional transition will correspondingly exhibit a smooth transition in the bulk CTE along the formed gradient. Because the resulting unitary part does not have significant localized CTE mismatch, the resulting unitary part will not exhibit localized thermally-induced stress concentrations that might lead to early failures. The induced material segregation methods disclosed herein accordingly achieve a desired segregation in the green-state materials containing the particulate form of the raw materials. After shaping for a final desired form, the green-state material may be compacted and sintered while maintaining the compositional segregation of the green-state in the final hardened state.

Although the present disclosure is described with respect to a PDC cutter that includes a part or portion having a polycrystalline diamond cutting surface at one face and a substrate material at an opposing face, one of ordinary skill in the art will recognize different PDC parts may be formed using the methods disclosed herein.

The substrate may include a cemented carbide, such as tungsten carbide (WC or $W_2C$). The substrate may further include a metal or metal alloy, such as a Group VIII metal or metal alloy, particularly cobalt (Co) or a Co alloy.

Figure 1:
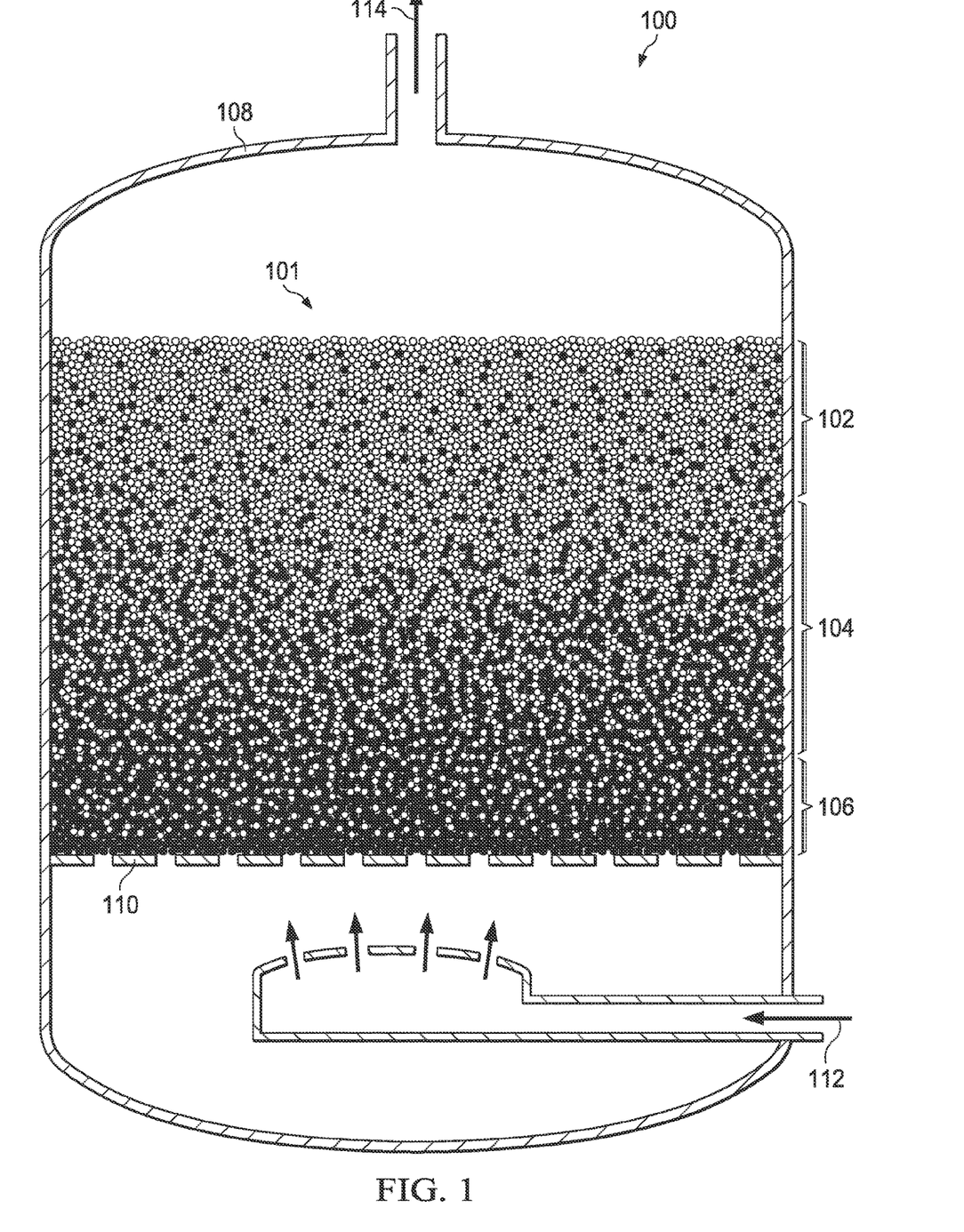
FIG. 1 is a cross-section view of an embodiment of an induced segregation reactor with two particulate phases.

Referring now to the drawings, FIG. 1 is a schematic illustration of an induced segregation reactor 100 for forming a green-state mixture 101 that may be achieved according to various induced segregation methods disclosed herein, such as but not limited to, fluidized bed segregation, vibratory bed segregation, and segregation using electrophoresis. FIG. 1 is a schematic illustration and is not drawn to scale. Induced segregation reactor 100 is shown as a fluidized bed reactor for performing fluidized bed segregation of green state mixture 101 having a first particulate phase shown in white and a second particulate phase shown in black. In various embodiments, vibratory bed segregation or electrophoresis segregation may be additionally or alternatively performed using induced segregation reactor 100.

In operation, the first particulate phase, the second particulate phase, and other additives may be introduced into reactor vessel 108. For example, when a solid-phase binder is used, the binder may be introduced into reactor vessel 108 with the first particulate phase and the second particulate phase prior to the induced segregation. When a liquid-phase binder is used, the binder may be introduced into reactor vessel 108 after the induced segregation. The contents of reactor vessel 108 may be introduced in various order, in different embodiments. In some cases, the individual raw materials for each of the phases and additives are separately introduced into reactor vessel 108. In other cases, mixtures of the raw materials, for example having a given concentration or particulate sizes, may be obtained and introduced in pre-mixed form to reactor vessel 108.

Within reactor vessel 108, the raw materials may be separated at one section using a distributor 110. Additional separators, such as mesh screens, may also be used at different locations within reactor vessel 108. When influent gas 112 is introduced, distributor 110 may ensure that a desired uniform gas flow is experienced by the contents of reactor vessel 108, whereby effluent gas 114 is released. For fluidized bed segregation, when influent gas 112 achieves a critical velocity within reactor vessel 108, the particulate contents of reactor vessel 108 become fluidized and may begin to segregate due to enhanced mobility when fluidized. Specifically, for particles having the same density, larger sized particles may tend to fall to the bottom of reactor vessel 108 when fluidized, while for particles having the same size, denser particles may tend to fall to the bottom of reactor vessel 108 when fluidized.

For vibratory bed segregation, the fluidization may be achieved by introducing vibration within reactor vessel 108 in addition to or in place of influent gas 112. In vibratory bed segregation, a source of vibration, such as piezoelectric transducers generating ultrasonic vibrations, are used to perform the induced segregation in reactor vessel 108 resulting in the segregated mixture.

For electrophoresis segregation, the individual particles may be charged and an electric field may be applied within reactor vessel 108 in addition to influent gas 112 to perform the induced segregation in reactor vessel 108 resulting in the segregated mixture.

It is noted that various process parameters for fluidization using induced segregation reactor 100 may be selected based on a specific induced segregation method used. For example the temperature and pressure within reactor vessel 108 may be regulated to desired values during the induced segregation. In some embodiments, process parameters within reactor vessel 108 are selected based on the composition of the contents of reactor vessel 108, such as whether a solid-phase binder or a liquid-phase binder is used.

Once a desired degree or extent of induced segregation is achieved within reactor vessel 108, influent gas 112, along with other means of fluidization when used, may be turned off causing the contents of reactor vessel 108 to cease fluidization and collapse. In one embodiment, when a solid-phase binder is used, the contents may be allowed to cool to form green-state mixture 101. In another embodiment, when a liquid-phase binder is used, the liquid binder may be introduced after the induced segregation to form green-state mixture 101.

Green-state mixture 101, as shown, exhibits a compositional gradient between the first particulate phase (white) and the second particulate phase (black) along a central axis of induced segregation reactor 100, as followed by effluent gas 114 in the exemplary embodiment of FIG. 1. In particular embodiments, the first particulate phase may comprise polycrystalline diamond, while the second particulate phase may comprise WC. It is noted that the particle sizes of the first particulate phase and the second particulate phase may vary in different embodiments, and may be different for each particulate phase. In fact, the particle sizes of the first particulate phase and the second particulate phase may be modulated in different embodiments to achieve different properties in the final single unitary part. Furthermore, various types of binders may be added to green-state mixture 101, which are not shown in FIG. 1 for descriptive clarity.

Specifically, at one end of green-state mixture 101, first portion 102 may have the first particulate phase present in a relatively rich concentration. In some embodiments, at least some of first portion 102 may be absent the second particulate phase. At second portion 104, the concentration gradient may begin in a direction away from first portion 102 with increasing concentration of the second particulate phase. Accordingly, second portion 104 includes both the first particulate phase and the second particulate phase. At the opposite end of green-state mixture 101 from first portion 102, third portion 106 may have the second particulate phase present in a relatively rich concentration. In some embodiments, at least some of third portion 106 may be absent the first particulate phase. Although a particular concentration gradient is depicted in FIG. 1, various types of concentration gradients may be achieved in green-state mixture 101, such as linear, parabolic, exponential, or other gradients, as desired.

When a liquid is introduced during the induced segregation, such as a liquid binder, a segregating liquid, or a solvent, the excess liquid may be removed or dried before the segregated mixture is consolidated into a green-state material. In the green-state material, the desired compositional gradient is preserved by the binder that immobilizes the particulate phases prior to final sintering. Accordingly, the green-state material generally has a larger size and a lower density than a final PDC cutter made therefrom. The green-state material may be formed to a desired shape and then subjected to a final HTHP sintering process to form a PDC cutter for a PDC bit.

Figure 2:
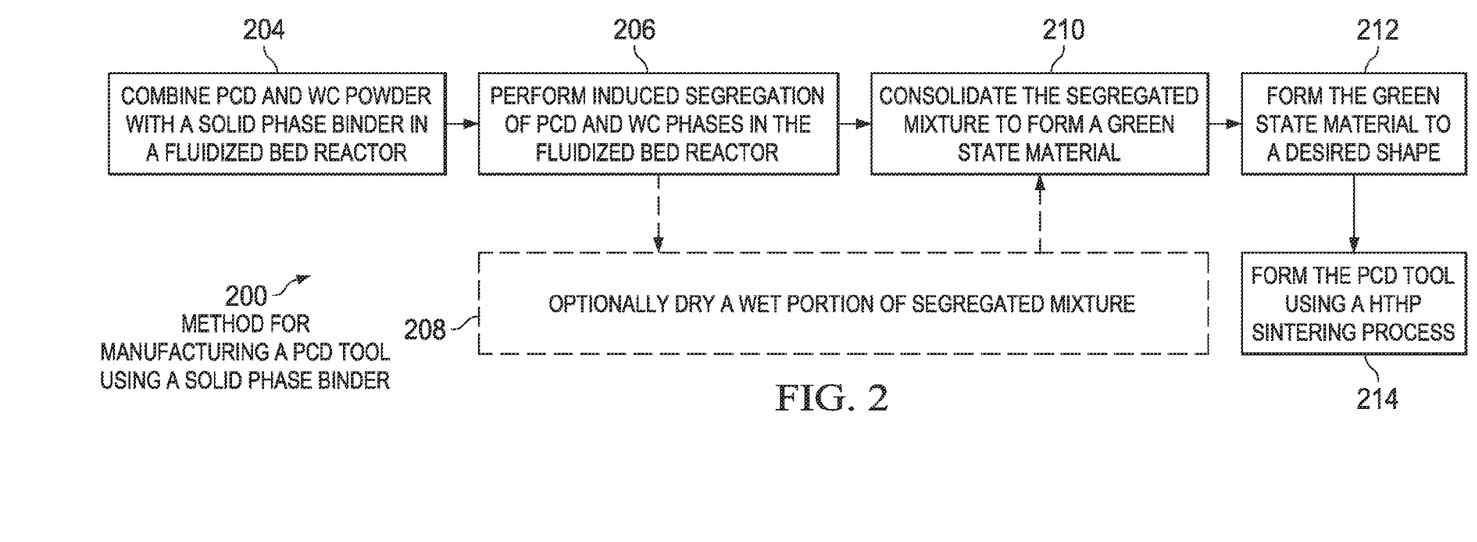
FIG. 2 is a flow-chart of an embodiment of a method for manufacturing a PDC cutter using a solid-phase binder.

Referring now to FIG. 2, a flowchart of an embodiment of a method 200 for manufacturing a PDC cutter using a solid-phase binder is illustrated. It is noted that operations shown in method 200 may be rearranged or omitted in different embodiments.

Method 200 may begin, at step 204, by combining polycrystalline diamond particulate and WC particulate with a solid phase binder in a reactor, such as induced segregation reactor 100 in FIG. 1. The reactor may also be referred to as a reactor vessel. The reactor may support or enable at least one of a fluidized bed segregation process, a vibratory bed segregation process, and an electrophoresis segregation process, as described previously.

The WC particulate used may include a suitable amount of Co, such as 5-20 wt % Co, which later acts as a catalyst to bind the polycrystalline diamond particles together. In some embodiments, a catalyst may be added that includes a Group VIII metal or alloy, such as Co, nickel (Ni), iron (Fe), or alloys thereof, and any combinations thereof. When present as a separate phase, the catalyst may be present in particles similar in size to the polycrystalline diamond particulate.

In some embodiments, the solid phase binder is introduced as a coating that is applied to at least one of the polycrystalline diamond particulate and the WC particulate prior to step 204. The thickness of the binder coating as well as the respective sizes of the polycrystalline diamond particulate and the WC particulate may be varied to achieve a desired compositional gradient, or for other purposes. In different embodiments, a particular distribution (or mixture) of different sized particles (or powders) is used for the polycrystalline diamond particulate, the WC particulate, or both. The particulate size used may vary and more than one particulate size may be used. The particulate size may be determined, for example, by passing the particles through one or more sizing sieves or by any other method. Particles may include various sizes, such as 100 µm, 90 µm, 80 µm, 70 µm, 60 µm, 50 µm, 40 µm, 30 µm, 20 µm, 15 µm, 12 µm, 10 µm, 8 µm, 4 µm, 2 µm, 1 µm, 0.5 µm, less than 0.5 µm, 0.1 µm, or less than 0.1 µm, or various combinations thereof.

In some embodiments, the solid phase binder is a third particulate (or powder) that is mixed with the polycrystalline diamond particulate and the WC particulate in the reactor at step 204. The binder may be a resin. In addition to the binder, another material may be added at step 204, or pre-combined with the binder, to modify the ability of Co to migrate or diffuse during subsequent sintering operations, because the subsequent HTHP process described below may be limited in the rate of change of process parameters. In particular, excessive infiltration of the catalyst through the interfacial layer and into the TSP can result in reduced gradients, which may reduce thermal stability as well. Examples of Co migration inhibitors that may be added to, or included with the binder include silicon, boron, titanium, hafnium, zirconium, niobium, vanadium, among others which may form carbides during the sintering process above 700° C. Such metallic migration inhibitors may assist in the sintering of the diamond, while resulting in a bonding matrix that is itself an extremely hard abrasive, such as silicon carbide, boron carbide, among others. In addition, such a bonding matrix may have approximately the same CTE as diamond and is chemically inert and will not catalyze the back-conversion of diamond to graphite. Furthermore, a transverse rupture strength of the compact may not be impaired due to the presence of the bonding matrix. While the use of a non-catalyst sintering aid is described in connection with the substrate, other uses are possible, such as to form the bonding matrix in an abrasive compact in situations where no substrate is used.

In various embodiments, a gradient interfacial layer (GIL) may be additionally formed with at least one additional component and with at least one layer. The composition and location of the GIL may be adjusted along with temperature, pressure, and other parameters to achieve a desired level of diffusion.

A non-catalyst sintering aid may be used in certain embodiments. The non-catalyst sintering aid may have a melting point at ultra-high pressures that is below that of cobalt (catalyst), and may comprise elemental silicon or alloys thereof. The non-catalyst sintering aid may infiltrate through interstices into the compact and may be converted to the carbide form or non-catalytic silicide or boride form before cobalt is released or infiltrated from the substrate during a heating and pressure cycle. For example, by placing the proper quantity of the non-catalyst sintering aid adjacent to a surface of the compact removed from the substrate, the interstices in the compact can be filled to a desired extent with the carbide form of the sintering aid by the time the temperature in the HTHP press reaches the melting point of cobalt, approximately 1500° C. In this manner, a degree of infiltration of the cobalt upon release may be moderated. In addition, since the non-catalyst sintering aid is converted to the carbide or the silicide or boride form prior to contact with the cobalt, a bond-inhibiting chemical reaction between the compact and the substrate may be prevented. In various embodiments, other means of modification of the rate of catalyst infiltration may be employed.

To the extent that the following binder material are introduced in solid form, the binder may be comprised of polyolefins, such as ethylene vinyl acetate, high density polyethylene, low density polyethylene, and polypropylene; functionalized polyolefins, such as ethylene ethyl acrylate, grafted maleic anhydride, and ionomers; waxes such as carnauba, bees wax, and bees wax blends; thermoplastic polyurethane; poly-aryl-ether-ether-ketones; functionalized styrenic block copolymers, such as anhydride grafted styrenic block copolymers; and tackifiers, such as pentaerythritol ester of rosin, glycero-ester of rosin modified with maleic anhydride, partially hydrogenated gum rosin, balsamic resin, esterified thermoplastic resin, partially polymerized (dimerized) rosin, aliphatic hydrocarbon resin, aliphatic hydrocarbon resin, aromatic modified aliphatic hydrocarbon resin, cycloaliphatic hydrocarbon resins, and aromatic modified cycloaliphatic hydrocarbon resin. The binder may be present in particles, such as particles having an average diameter or longest dimension of 100 µm.

In different embodiments, other binder materials may be used in various combinations. In some embodiments, the binder may include different polymers, including water-based polymers, gelation polymers, and inorganic polymers. Polymers for gelation may comprise polyvinyl alcohol, polyethylene glycol, polysaccharides, alginates, cellulose, or combinations thereof and may be aqueous. An inorganic polymer binder may comprise silicone. Some binders may comprise wax, natural oil, mineral oil, synthetic oil, or mixtures thereof. Examples of certain organic binder materials may include acetates (polyethylene-butyl acetate (PEBA), ethylene vinyl acetate (EVA), ethylene ethyl acetate), glycols and alcohols (polyethylene glycol (PEG), poly vinyl alcohol (PVA)), carbonates (polyethylene carbonate (PEC), polyalkylene carbonate (PAC), polycarbonate, polypropylene carbonate (PPC)), acrylics (acrylic, vinyl acrylic (PVA), and styrene acrylic), as well as polystyrene (PS), polymethyl methacrylate, nylons, polyvinyl chlorides, polybutenes, and polyesters. In different embodiments, binder materials may be selected to leave a minimum amount of residue (also referred to as 'char') after undergoing an HTHP process.

Then, at step 206, induced segregation of the polycrystalline diamond particulate and the WC particulate is performed in the reactor to form a segregated mixture. Depending on the type of segregation process used, as well as the choice of binder material, one or more process parameters may be varied or set during the induced segregation, such as temperature, pressure, flow rate, vibration frequency, current, voltage, etc. In some cases, additional process additives, such as a solvent, may be introduced during induced segregation.

At the completion of step 206, the segregated mixture exhibits the compositional gradient of polycrystalline diamond and WC as in the final PDC element, such as shown in FIG. 1. It is noted that the compositional gradient may be a narrow gradient, such as from 40% to 60% polycrystalline diamond, 1% to 5% polycrystalline diamond, or 90% to 98% polycrystalline diamond, as non-limiting example gradients, with the remaining portion consisting of WC. The compositional gradient may be a wide gradient, such as from <1% to >99% polycrystalline diamond, such that at a first face or edge, the segregated mixture is diamond-rich or substantially pure diamond and at a second face or edge at an opposite end of the compositional gradient, the segregated mixture is WC-rich or substantially pure WC.

When an additional liquid additive is used at step 206, step 208 may be optionally performed after step 206. At step 208, a liquid portion of the segregated mixture may be removed, optionally when present. Step 208 may involve evaporation (using vacuum, gas flow, heat, etc.), draining, or another process method to remove the liquid portion from the reactor.

Then, after step 206 or step 208, the segregated mixture is consolidated to form a green-state material at step 210. In step 210, the binder may be dispersed and hardened using various means to immobilize the polycrystalline diamond particulate and the WC particulate, thereby creating a mechanically and chemically stable green-state material that exhibits the compositional gradient. The consolidation in step 210 may include applying heat, pressure, radiation, or combinations thereof, to fix or cure the binder. In the green-state material, the binder material is bonded to the polycrystalline diamond particulate and the WC particulate, as well as bonded together with other binder material. In different embodiments, the green-state material may have relatively low porosity. The green-state material may be formed as a bulk material in step 210 to allow for multiple final PDC cutter parts to be manufactured.

At step 212, the green-state material may be formed to a desired shape. The green-state material may be machined or cut using various processes. A green-state piece may be in the form of a slab, plate, rod, preform, or stock. Shaping and forming methods suitable for use with green-state pieces include cutting, e-beam, forging, heat treatment, and shot peening. It is noted that steps 204 through 212 may be performed on an industrial scale that is independent of subsequent operations or steps in method 200. In this manner, the desired shape of the green-state material may be pre-manufactured as a semi-finished product that can be stored and used at a later time, which may significantly contribute to an economic advantage of method 200, by enabling an optimal economic scale of performing steps 204 through 212.

Finally, an HTHP sintering process may be used at step 214 to form the PDC cutter. The PDC cutter may be formed as a two-layer or as a three-layer element in step 214 (see also FIGS. 4A and 4B). The HTHP sintering process in step 214 may involve a single temperature and pressure cycle to simultaneously eliminate the binder and sinter the polycrystalline diamond particulate and the WC particulate in the green-state material together. In some embodiments, an intermediate temperature and pressure cycle may first be performed to eliminate the binder from the green-state material, while a final temperature and pressure cycle is used to sinter the polycrystalline diamond particulate and the WC particulate together. During the HTHP process, the binder may be eliminated by various chemical processes, depending on the type of binder used. The binder may chemically decompose or be reduced to carbon (such as for volatile organic compounds) which is then incorporated into the diamond structure during the HTHP process. The binder may evaporate and be released as a gas. Some small residual portions or by-products of the binder may remain within acceptable concentration limits, such as minimum thresholds.

The temperature of the HTHP process may be at least 1000° C., at least 1200° C., or at least 1600° C., and the pressure may be at least 4.0 GPa, 5.0 GPa to 15 GPa, or 7.5 GPa to 11 GPa. The HTHP process may occur for a length of time sufficient to sinter the polycrystalline diamond particulate to form a sintered compositional gradient with the WC particulate, as shown in FIG. 1. In one example, the pressure of the high temperature high pressure process is 8 GPa to 10 GPa and the temperature is 1150° C. to 1450° C. The foregoing pressure values employed in the HTHP process refer to the pressure in the pressure transmitting medium that transfers the pressure from a ultra-high pressure press.

During the HTHP process, catalyst present the green-state material liquefies and catalyzes formation of directly bonded-together diamond grains to form sintered polycrystalline diamond. In given embodiments of step 214, an additional leaching step may be performed to remove any catalyst or binder that remains after the HTHP process. Such additional leaching may extend as far as possible into polycrystalline diamond layer, or may be confined to a surface, such as a working surface or a side surface of the polycrystalline diamond phase.

After sintering, the PDC cutter may be subjected to a planarization process, such as lapping. Alternatively a grinding process may be used to produce a nonplanar surface for mating to another element with corresponding nonplanar surfaces for attachment.

The PDC elements described herein may be inspected for quality prior to formation of final PDC cutters. Quality inspection may include visual, sonic, radiation, such as computed tomography (CT), and non-radiation inspection.

Figure 3:
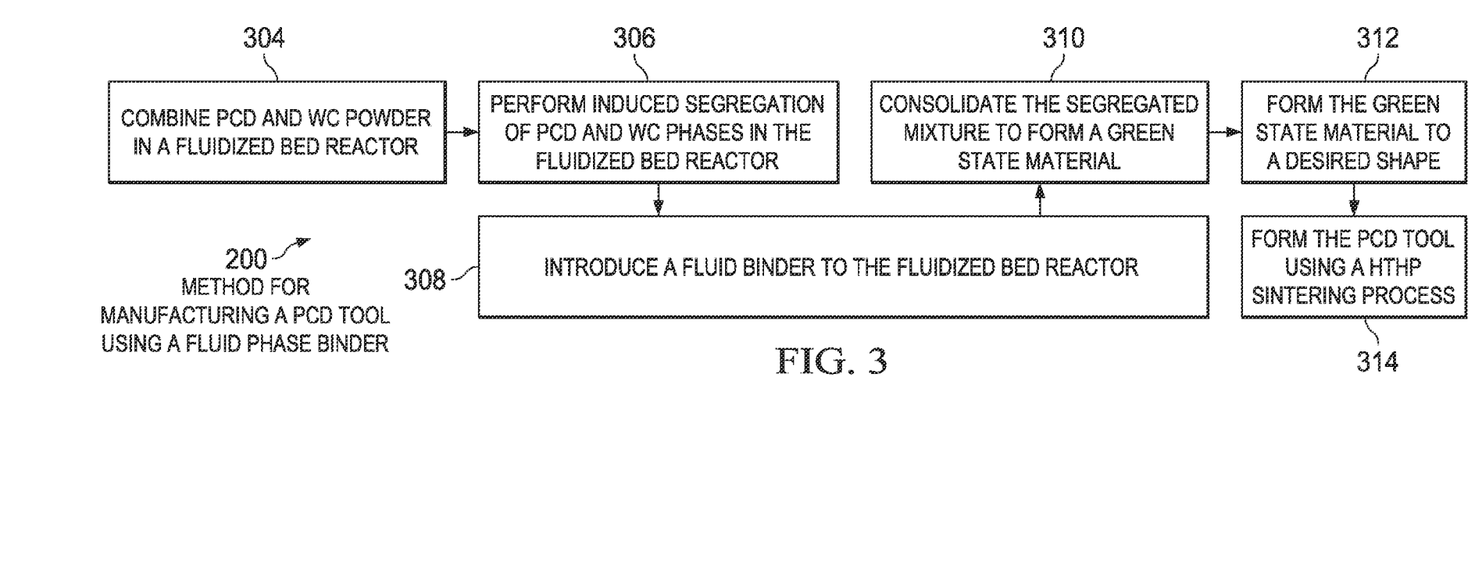
FIG. 3 is a flow-chart of an embodiment of a method for manufacturing a PDC cutter using a fluid-phase binder.

Referring now to FIG. 3, a flowchart of an embodiment of a method 300 for manufacturing a PDC cutter using a fluid-phase binder is illustrated. It is noted that operations shown in method 300 may be rearranged or omitted in different embodiments.

Method 300 may begin, at step 304, by combining polycrystalline diamond particulate and WC particulate in a reactor, such as induced segregation reactor 100 in FIG. 1. The reactor may also be referred to as a reactor vessel. The reactor may support or enable at least one of a fluidized bed segregation process, a vibratory bed segregation process, and an electrophoresis segregation process, as described previously. As noted above with respect to method 200 in FIG. 2, the WC particulate may include a catalyst, or a catalyst may be added as an additional phase.

Then, at step 306, induced segregation of the polycrystalline diamond particulate and the WC particulate is performed in the reactor to form a segregated mixture. Depending on the type of segregation process used, one or more process parameters may be varied or set during the induced segregation, such as temperature, pressure, flow rate, vibration frequency, current, voltage, etc.

At step 308, a fluid binder may be introduced to the reactor. To the extent that binder materials used in method 200 are available in fluid form, the binder may comprise compositions listed above with respect to FIG. 2. The fluid binder may be a liquid phase or may be a liquid phase dissolved in a solvent. The binder may be a polyolefin dispersion, such as a HYPOD™ polyolefin dispersion from The Dow Chemical Company (Midland, Mich., USA). The binder may be an emulsion, such as a latex. The binder may be a resin melt, for example, when the reactor temperature facilitates melting of the resin used.

At the completion of step 306, the segregated mixture exhibits the compositional gradient of polycrystalline diamond and WC as in the final PDC element, such as shown in FIG. 1. It is noted that the compositional gradient may be a narrow gradient, such as from 40% to 60% polycrystalline diamond, 1% to 5% polycrystalline diamond, or 90% to 98% polycrystalline diamond, as non-limiting example gradients, with the remaining portion consisting of WC. The compositional gradient may be a wide gradient, such as from <1% to >99% polycrystalline diamond, such that at a first face or edge, the segregated mixture is diamond-rich or substantially pure diamond and at a second face or edge at an opposite end of the compositional gradient, the segregated mixture is WC-rich or substantially pure WC.

Then, at step 309, excess fluid may be removed from the reactor and the segregated mixture. The excess fluid may be a solvent or a liquid portion of the binder that remains unused. Then, after step 309, the segregated mixture is consolidated to form a green-state material at step 310. In step 310, the binder may be dispersed and hardened using various means to immobilize the polycrystalline diamond particulate and the WC particulate, thereby creating a mechanically and chemically stable green-state material that exhibits the compositional gradient. The consolidation in step 310 may include applying heat, pressure, radiation, or combinations thereof, to fix or cure the binder. Thus, the consolidation of the segregated mixture having the fluid binder at step 310 may be a phase change, such as a solidification or hardening through cooling. The consolidation of the segregated mixture having the fluid binder at step 310 may be a chemical change, such as curing or cross-linking (vulcanization). The consolidation of the segregated mixture having the fluid binder at step 310 may be a phase separation, such as evaporation of a solvent.

In the green-state material, the binder material is bonded to the polycrystalline diamond particulate and the WC particulate, as well as bonded together with other binder material. In different embodiments, the green-state material may have relatively low porosity. The green-state material may be formed as a bulk material in step 310 to allow for multiple final PDC cutter parts to be manufactured.

The processing of the green-state material may be substantially similar in method 300 to the corresponding operations and steps described above with respect to method 200. Accordingly, method 300 is shown including steps 212 and 214, as described previously.

Figure 4A:
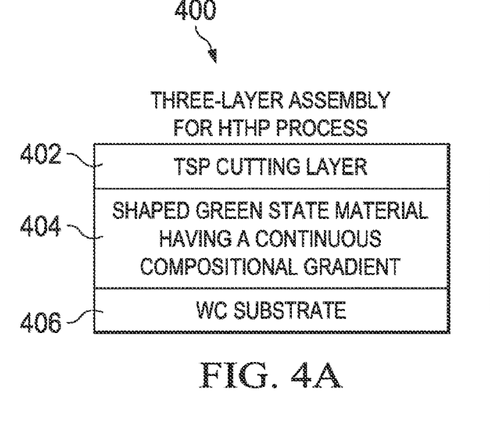
FIGS. 4A and 4B are cross-section views of embodiments of assemblies for an HTHP process for manufacturing a PDC cutter.

Referring now to FIG. 4A, a three-layer assembly 400 for an HTHP process for manufacturing a PDC cutter is shown. Three-layer assembly 400 may be introduced into the HTHP process at step 214. Three-layer assembly 400 may include a thermally stable polycrystalline (TSP) cutting layer 402, green-state layer 404, and WC substrate 406. Green-state layer 404 may be a shaped green-state material having a continuous compositional gradient, as formed after step 214 in FIGS. 2 and 3. As shown, three-layer assembly 400 may incorporate green-state layer 404, as described herein, to bond WC substrate 406 to TSP cutting layer 402 to form a PDC cutter having TSP cutting layer 402. At a first face of green-state layer 404 in contact with WC substrate 406, green-state layer 404 may have a maximum concentration of WC in the continuous compositional gradient. At a second face of green-state layer 404 in contact with TSP cutting layer 402, green-state layer 404 may have a maximum concentration of diamond in the continuous compositional gradient. Because green-state layer 404 is transformed into a polycrystalline diamond/WC composite having a smooth compositional gradient, three-layer assembly 400 may have no significant discrete compositional boundaries, and accordingly may exhibit little or no CTE mismatch among, between, and within layers 402, 404, and 406.

Figure 4B:
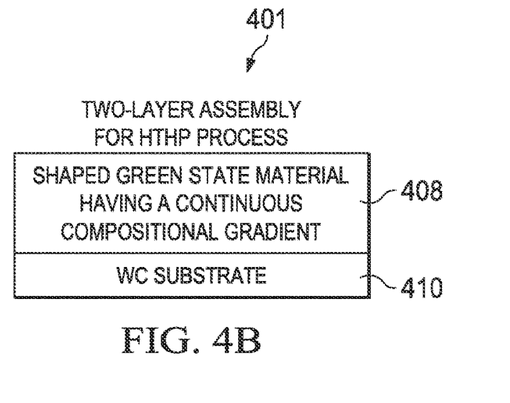

Referring now to FIG. 4B, a two-layer assembly 401 for an HTHP process for manufacturing a PDC cutter is shown. Two-layer assembly 401 may be introduced into the HTHP process at step 214. Two-layer assembly 401 may include green-state layer 408 and WC substrate 410. Green-state layer 408 may be a shaped green-state material having a continuous compositional gradient, as formed after step 214 in FIGS. 2 and 3. As shown, two-layer assembly 401 may incorporate green-state layer 408, as described herein, to bond to WC substrate 410 at a WC-rich surface, while a diamond-rich surface of green-state layer 408 may be used to form a cutting surface. At a first face of green-state layer 408 in contact with WC substrate 410, green-state layer 408 may have a maximum concentration of WC in the continuous compositional gradient. Because green-state layer 408 is transformed into a polycrystalline diamond/WC composite having a smooth compositional gradient, two-layer assembly 401 may have no significant discrete compositional boundaries, and accordingly may exhibit little or no CTE mismatch among, between, and within layers 408 and 410.

Figure 5:
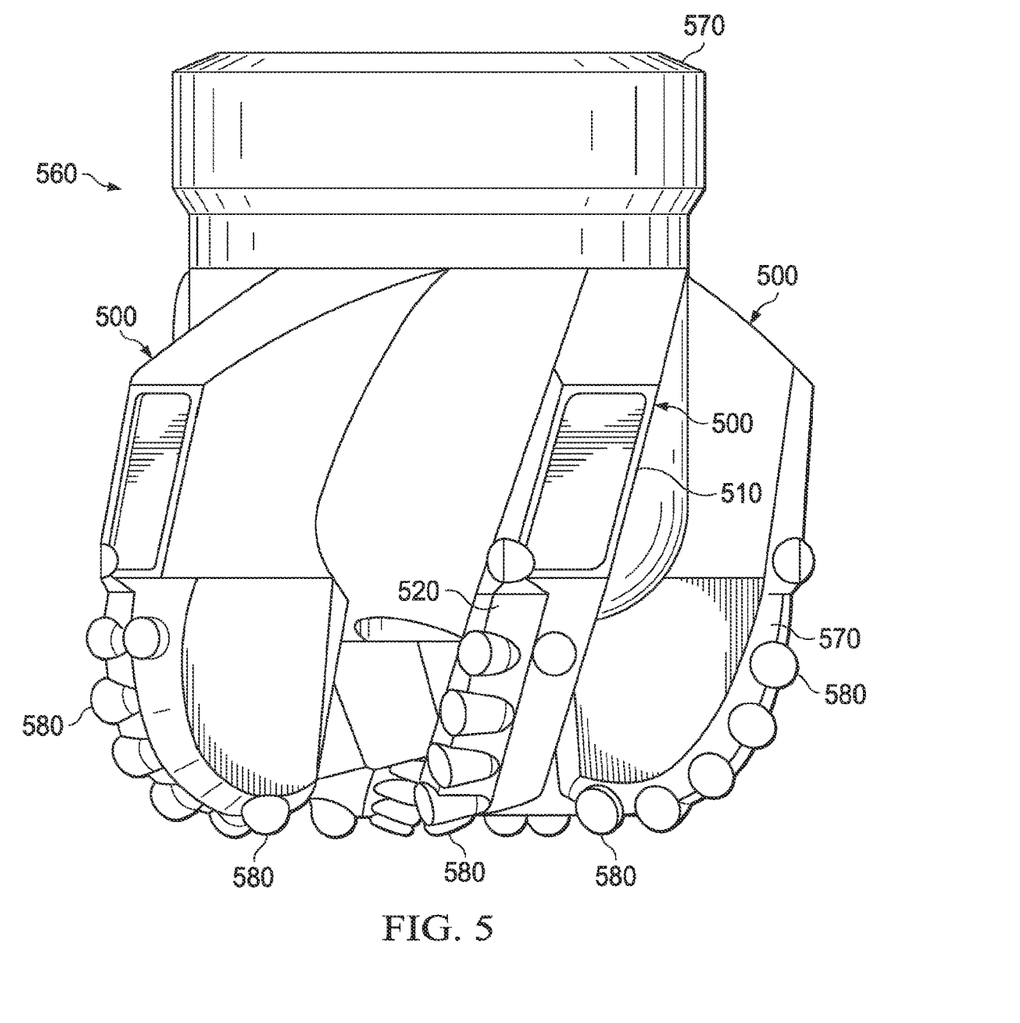
FIG. 5 is an embodiment of an earth-boring drill bit including at least one PDC cutter manufactured according to the methods described herein.

Referring now to FIG. 5, an earth-boring drill bit 500 including PDC cutters formed according to the induced segregation method of manufacturing, as described herein, is illustrated. In FIG. 5, earth-boring drill bit 500 is shown as a fixed cutter drill bit containing a plurality of cutters 580 coupled to drill bit body 570. For the embodiment shown in FIG. 5, earth-boring drill bit 300 has five (5) blades 502. For some applications the number of blades disposed on a fixed cutter drill bit incorporating teachings of the present disclosure may vary between four (4) and eight (8) blades or more.

At least one of cutters 580 may be a PDC cutter formed according to any of the induced segregation methods of manufacturing described herein. Earth-boring drill bit 500 may include bit body 570 with a plurality of blades 502 extending therefrom. Bit body 570 may be formed from steel, a steel alloy, a matrix material, or other suitable bit body material desired strength, toughness and machinability. Bit body 570 may be formed to have desired wear and erosion properties. Cutters 580 may be mounted on the bit using methods of this disclosure or using other methods. For example, a WC substrate included with cutter 580 may be brazed to blade 502. Cutters 580 may be located in gage region 520, in a non-gage region, or both.

The drilling action associated with earth-boring drill bit 500 may occur as bit body 570 is rotated relative to the bottom (not expressly shown) of a wellbore in response to rotation of an associated drill string (not expressly shown). At least some cutters 580 disposed on associated blades 502 may contact adjacent portions of a downhole formation (not expressly shown) drilling. PDC cutters of various forms and shapes may also be attached to other portions of drill bit 500 (not expressly shown), such a high-wear areas, including those near nozzles, in junk slots, or in dampening or depth of cut control regions.

As disclosed herein, induced material segregation methods of manufacturing a polycrystalline diamond compact (PDC) cutter result in formation of a polycrystalline diamond/tungsten carbide (WC) composite material having a smooth compositional gradient from maximum WC concentration at one face to maximum diamond concentration at another face. Because the compositional gradient is smooth, very little or no mismatch of coefficient of thermal expansion occurs, which improves a service lifetime of the PDC cutter.

In one aspect, a first disclosed method is for manufacturing a polycrystalline diamond compact (PDC) cutter. The first method includes introducing a polycrystalline diamond particulate, a substrate particulate, and a binder in a reactor. In the first method, the binder is a solid phase material at room temperature. The first method further includes performing induced segregation of the polycrystalline diamond particulate and the substrate particulate in the reactor to form a segregated mixture having a continuous compositional gradient of the polycrystalline diamond particulate and the substrate particulate along an axis of the segregated mixture. The first method also includes consolidating the segregated mixture to form a green-state material, including the binder immobilizing the polycrystalline diamond particulate and the substrate particulate in the green-state material. The first method still further includes performing a high-temperature high-pressure (HTHP) sintering process on the green-state material to form the PDC cutter, including applying sintering process conditions to eliminate the binder during the HTHP sintering process.

In any of the disclosed embodiments, the first method may include applying the binder prior to introduction into the reactor as a coating to at least one of the polycrystalline diamond particulate and the substrate particulate. In any of the disclosed embodiments of the first method, the binder may be a resin. In any of the disclosed embodiments of the first method, the binder may include a material that modifies the diffusion of a catalyst used in the HTHP sintering process.

In any of the disclosed embodiments of the first method, performing the induced segregation may include using at least one of: a fluidized bed segregation process; a vibratory bed segregation process; and an electrophoresis segregation process. In the first method, the substrate particulate may comprise tungsten carbide (WC).

In any of the disclosed embodiments of the first method, performing the induced segregation may include forming the segregated mixture having the continuous compositional gradient beginning with a WC-rich phase at one end of the axis and ending with a polycrystalline diamond-rich phase at another end of the axis.

In any of the disclosed embodiments, the first method may include mechanically forming the green-state material to a desired shape.

In any of the disclosed embodiments of the first method, performing the HTHP sintering process may include placing the green-state material adjacent to a WC substrate at a first face of the green-state material. In the first method, the first face may have a maximum concentration of WC in the continuous compositional gradient.

In any of the disclosed embodiments of the first method, performing the HTHP sintering process may include placing the green-state material adjacent to thermally stable polycrystalline diamond at a second face of the green-state material opposite the first face. In the first method, the second face may have a maximum concentration of polycrystalline diamond in the continuous compositional gradient.

In any of the disclosed embodiments, the first method may include manufacturing and storing the green-state material prior to performing the HTHP sintering process.

In any of the disclosed embodiments of the first method, performing the HTHP process may include performing an intermediate stage during which a first temperature and a first pressure are applied to eliminate the binder, and performing a final stage during which a second temperature and a second pressure are applied to sinter the PDC cutter.

In another aspect, a second disclosed method is for manufacturing a polycrystalline diamond compact (PDC) cutter. The second method includes introducing a polycrystalline diamond particulate and a substrate particulate in a reactor. The second method further includes performing induced segregation of the polycrystalline diamond particulate and the substrate particulate in the reactor to form a segregated mixture having a continuous compositional gradient of the polycrystalline diamond particulate and the substrate particulate along an axis of the segregated mixture. The second method also includes, after performing the induced segregation, introducing a binder to the reactor. In the second method, the binder is a fluid phase material in the reactor. The second method further includes consolidating the segregated mixture to form a green-state material, including the binder immobilizing the polycrystalline diamond particulate and the substrate particulate in the green-state material. The second method still further includes performing a high-temperature high-pressure (HTHP) sintering process on the green-state material to form the polycrystalline diamond tool element, including applying sintering process conditions to eliminate the binder during the HTHP sintering process.

In any of the disclosed embodiments of the second method, the binder includes at least one of: a liquid phase, a dispersion, an emulsion, and a resin melt.

In any of the disclosed embodiments, the second method may include, prior to consolidating the segregated mixture, removing excess fluid from the reactor. In the second method, consolidating the segregated mixture may further include a consolidation mechanism selected from at least one of: inducing a phase change to solidify the binder, inducing a chemical change to solidify the binder, and removing a solvent in which the binder is dissolved.

In any of the disclosed embodiments of the second method, performing the induced segregation may include using at least one of: a fluidized bed segregation process; a vibratory bed segregation process; and an electrophoresis segregation process.

In any of the disclosed embodiments, the second method may include mechanically forming the green-state material to a desired shape.

In any of the disclosed embodiments of the second method, the substrate particulate may include tungsten carbide (WC). In any of the disclosed embodiments, the second method may include forming the segregated mixture having the continuous compositional gradient beginning with a WC-rich phase at one end of the axis and ending with a polycrystalline diamond-rich phase at another end of the axis. In any of the disclosed embodiments of the second method, performing the HTHP sintering process may include placing the green-state material adjacent to a WC substrate at a first face of the green-state material. In the second method, the first face may have a maximum concentration of WC in the continuous compositional gradient.

In any of the disclosed embodiments of the second method, performing the HTHP sintering process may include placing the green-state material adjacent to a thermally stable polycrystalline diamond substrate at a second face of the green-state material opposite the first face. In the second method, the second face may have a maximum concentration of polycrystalline diamond in the continuous compositional gradient.

In any of the disclosed embodiments, the second method may include manufacturing and storing the green-state material prior to performing the HTHP sintering process.

In any of the disclosed embodiments of the second method, performing the HTHP process may include performing an intermediate stage during which a first temperature and a first pressure are applied to eliminate the binder, and performing a final stage during which a second temperature and a second pressure are applied to sinter the PDC cutter.

Although exemplary embodiments of the invention are specifically described above, it will be appreciated that modifications and variations of these examples are possible without departing from the spirit and intended scope of the invention. For instance, the use of PDC cutters on other industrial devices may be determined by reference to the drill bit example.

What is claimed is:

1. A method of manufacturing a polycrystalline diamond compact (PDC) cutter, the method comprising:
   introducing a polycrystalline diamond particulate, a substrate particulate, and a binder in a reactor, wherein the binder is a solid phase material at room temperature;
   performing induced segregation of the polycrystalline diamond particulate and the substrate particulate in the reactor to form a segregated mixture having a continuous compositional gradient of the polycrystalline diamond particulate and the substrate particulate along an axis of the segregated mixture, wherein the continuous compositional gradient begins with a substrate-rich phase at one end of the axis and ends with a polycrystalline diamond-rich phase at the other end of the axis;
   consolidating the segregated mixture to form a green-state material, including the binder immobilizing the polycrystalline diamond particulate and the substrate particulate in the green-state material;
   placing the green-state material adjacent to a substrate at a first face of the green-state material, wherein the first face has a maximum concentration of substrate in the continuous compositional gradient;
   placing the green-state material adjacent to thermally stable polycrystalline diamond at a second face of the green-state material opposite the first face, wherein the second face has a maximum concentration of polycrystalline diamond in the continuous compositional gradient; and
   performing a high-temperature high-pressure (HTHP) sintering process on the green-state material to form the PDC cutter, including applying sintering process conditions to eliminate the binder during the HTHP sintering process.

2. The method of claim 1, further comprising:
   applying the binder prior to introduction into the reactor as a coating to at least one of the polycrystalline diamond particulate and the substrate particulate.

3. The method of claim 1, wherein the binder includes a material that modifies the diffusion of a catalyst used in the HTHP sintering process.

4. The method of claim 1, wherein performing the induced segregation further comprises:
   using at least one of: a fluidized bed segregation process; a vibratory bed segregation process; and an electrophoresis segregation process.

5. The method of claim 1, wherein the substrate particulate comprises tungsten carbide (WC), and wherein the binder is a resin.

6. The method of claim 5, wherein performing the HTHP sintering process further comprises:
   placing the green-state material adjacent to a WC substrate at the first face of the green-state material, wherein the first face has a maximum concentration of WC in the continuous compositional gradient.

7. The method of claim 6, wherein performing the HTHP sintering process further comprises:
   placing the green-state material adjacent to thermally stable polycrystalline diamond at the second face of the green-state material, wherein the second face has a maximum concentration of polycrystalline diamond in the continuous compositional gradient.

8. The method of claim 1, further comprising:
   mechanically forming the green-state material to a desired shape.

9. The method of claim 1, further comprising:
   manufacturing and storing the green-state material prior to performing the HTHP sintering process.

10. The method of claim 1, wherein performing the HTHP process further comprises:
    performing an intermediate stage during which a first temperature and a first pressure are applied to eliminate the binder; and
    performing a final stage during which a second temperature and a second pressure are applied to sinter the PDC cutter.

11. A method of manufacturing a polycrystalline diamond compact (PDC) cutter, the method comprising:
    introducing a polycrystalline diamond particulate and a substrate particulate in a reactor;
    performing induced segregation of the polycrystalline diamond particulate and the substrate particulate in the reactor to form a segregated mixture having a continuous compositional gradient of the polycrystalline diamond particulate and the substrate particulate along an axis of the segregated mixture, wherein the continuous compositional gradient begins with a substrate-rich phase at one end of the axis and ends with a polycrystalline diamond-rich phase at the other end of the axis;
    after performing the induced segregation, introducing a binder to the reactor, wherein the binder is a fluid phase material in the reactor;

consolidating the segregated mixture to form a green-state material, including the binder immobilizing the polycrystalline diamond particulate and the substrate particulate in the green-state material;

placing the green-state material adjacent to a substrate at a first face of the green-state material, wherein the first face has a maximum concentration of substrate in the continuous compositional gradient;

placing the green-state material adjacent to thermally stable polycrystalline diamond at a second face of the green-state material opposite the first face, wherein the second face has a maximum concentration of polycrystalline diamond in the continuous compositional gradient; and performing a high-temperature high-pressure (HTHP) sintering process on the green state material to form the polycrystalline diamond tool element, including applying sintering process conditions to eliminate the binder during the HTHP sintering process.

12. The method of claim 11, wherein the binder includes at least one of:
a liquid phase;
a dispersion;
an emulsion; and
a resin melt.

13. The method of claim 11, further comprising:
prior to consolidating the segregated mixture, removing excess fluid from the reactor, and wherein consolidating the segregated mixture further comprises a consolidation mechanism selected from at least one of:
inducing a phase change to solidify the binder;
inducing a chemical change to solidify the binder; and
removing a solvent in which the binder is dissolved.

14. The method of claim 11, wherein performing the induced segregation further comprises:
using at least one of: a fluidized bed segregation process; a vibratory bed segregation process; and an electrophoresis segregation process.

15. The method of claim 11, further comprising:
mechanically forming the green-state material to a desired shape.

16. The method of claim 11, wherein the substrate particulate comprises tungsten carbide (WC).

17. The method of claim 16, wherein performing the HTHP sintering process further comprises:
placing the green-state material adjacent to a WC substrate at the first face of the green-state material, wherein the first face has a maximum concentration of WC in the continuous compositional gradient.

18. The method of claim 17, wherein performing the HTHP sintering process further comprises:
placing the green-state material adjacent to thermally stable polycrystalline diamond at the second face of the green-state material opposite the first face, wherein the second face has a maximum concentration of polycrystalline diamond in the continuous compositional gradient.

19. The method of claim 11, further comprising:
manufacturing and storing the green-state material prior to performing the HTHP sintering process.

20. The method of claim 11, wherein performing the HTHP process further comprises:
performing an intermediate stage during which a first temperature and a first pressure are applied to eliminate the binder; and
performing a final stage during which a second temperature and a second pressure are applied to sinter the PDC cutter.

* * * * *